United States Patent [19]

Fujita

[11] Patent Number: 5,024,285
[45] Date of Patent: * Jun. 18, 1991

[54] SLIPPAGE PREVENTING APPARATUS FOR A VEHICLE

[75] Inventor: Nagahisa Fujita, Hiroshima, Japan

[73] Assignee: Mazda Motor Corporation, Hiroshima, Japan

[*] Notice: The portion of the term of this patent subsequent to Oct. 25, 2005 has been disclaimed.

[21] Appl. No.: 224,372

[22] Filed: Jul. 26, 1988

[30] Foreign Application Priority Data

Jul. 30, 1987 [JP] Japan ............................. 62-188827

[51] Int. Cl.$^5$ ............................................ B60K 31/00
[52] U.S. Cl. ................................ 180/197; 303/103; 364/426.03
[58] Field of Search .................. 180/197; 364/426.01, 364/426.02, 426.03; 303/94, 95, 103

[56] References Cited

U.S. PATENT DOCUMENTS

| | | | |
|---|---|---|---|
| 4,765,430 | 8/1988 | Schulze et al. | 180/197 |
| 4,776,424 | 10/1988 | Naito | 180/197 |
| 4,779,696 | 10/1988 | Harada et al. | 180/197 |
| 4,790,404 | 12/1988 | Naito | 180/197 |

FOREIGN PATENT DOCUMENTS 62-91325  4/1987  Japan .

OTHER PUBLICATIONS

Partial Translation of Japanese Patent Application No. 62 91325.

*Primary Examiner*—Andres Kashnikow
*Assistant Examiner*—Michael Mar
*Attorney, Agent, or Firm*—Fish & Richardson

[57] ABSTRACT

As slip amounts or amounts of slippage of the driven wheels on pavement get larger, the torques to be applied to the driven wheels are reduced. The slip amounts of the driven wheels are determined on the basis of a vehicle speed and rotational speeds of the driven wheels, and the vehicle speed is determined as a vehicle speed of the vehicle body against pavement at a given reference position of the vehicle body. The torque to be reduced upon slippage of the driven wheels is corrected on the basis of a difference in cornering radius between a cornering radius at the reference position and a cornering radius of the driven wheel.

22 Claims, 13 Drawing Sheets

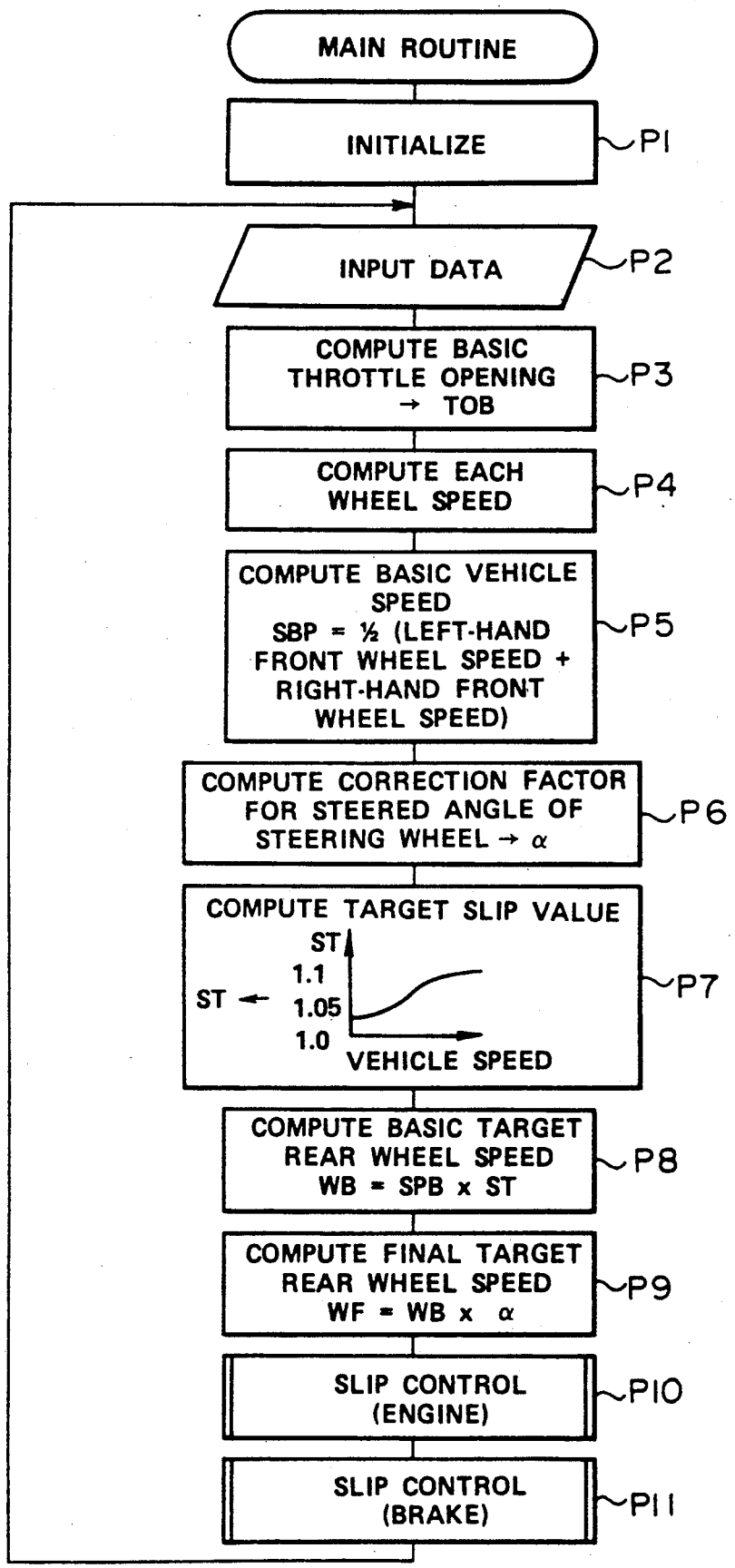

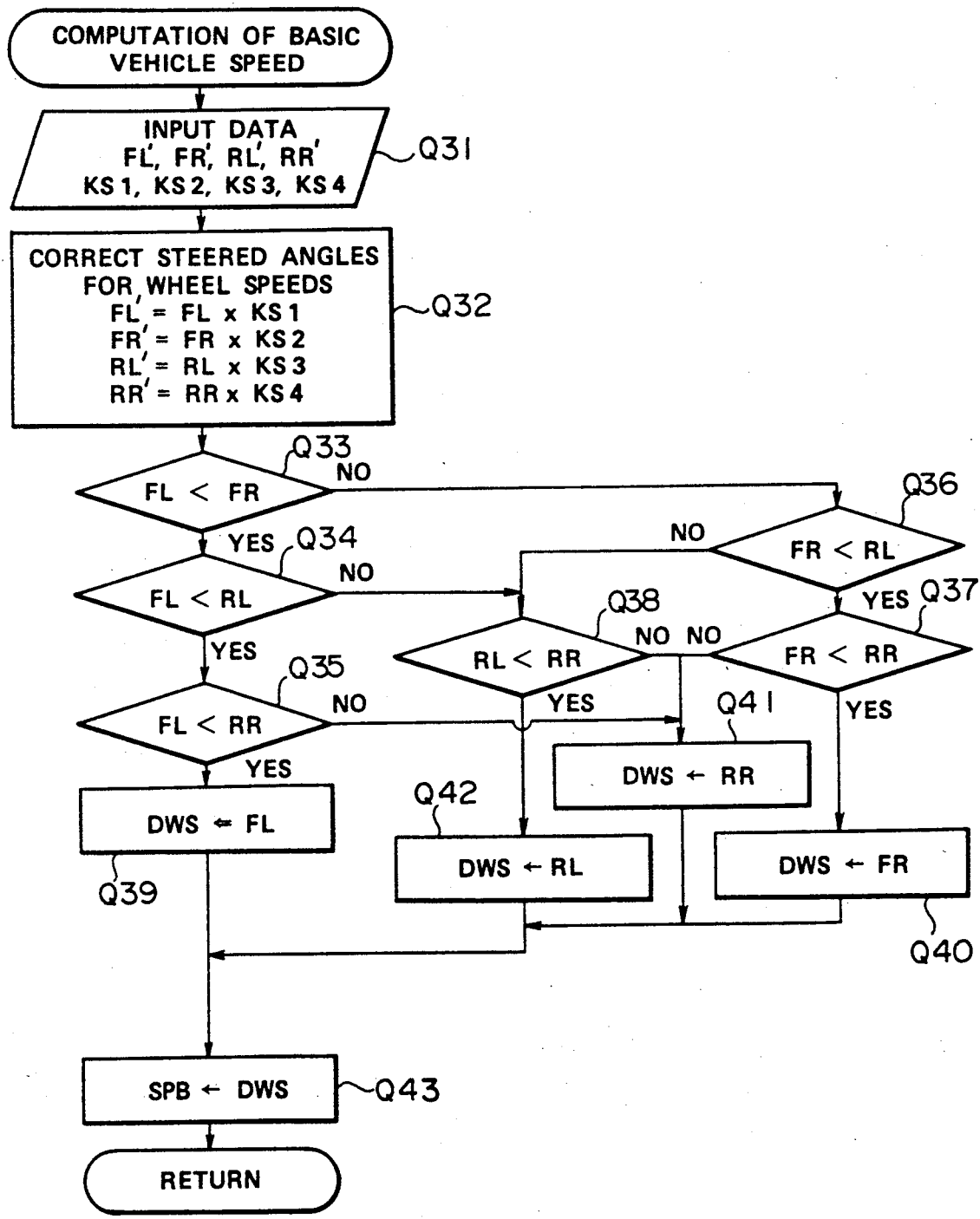

SLIPPAGE PREVENTING APPARATUS FOR A VEHICLE

BACKGROUND OF THE INVENTION

1. Field of the Invention

The present invention relates to a slippage preventing apparatus for a vehicle.

2. Description of Related Art

Prevention of a large degree of slippage of the driven wheels on pavement permits an effective provision of an impellent force with the vehicle and is effective from a standpoint of safety in order to prevent the spinning of the vehicle. It is known that an increase in an amount of slippage of the driven wheel may be prevented by decreasing a torque to be applied to the driven wheels, which may cause slippage.

Japanese Patent Publication (laid-open) Nos. 16,948/1983 and 56,662/1985 disclose a slip control in which a torque to the driven wheels is decreased by applying a braking force to the driven wheels through the brake and by decreasing a torque output from the engine. More specifically, Japanese Patent Publication (laid-open) No. 16,948/1983 is directed to such a slip control as solely braking the driven wheels, on the one hand, when a degree of slippage is smaller, and as additionally decreasing the torque output from the engine, on the other hand, when a degree of slippage becomes larger. Japanese Patent Publication (laid-open) No. 56,662/1985 is directed to a slip control technology such that, when one of the left-hand and right-hand driven wheels slips to a larger degree than the other, only the one driven wheel is braked and, when the left-hand and right-hand driven wheels both slip to a greater degree, an output torque from the engine is reduced in addition to the braking against the driven wheels.

In order to implement the slip control against the driven wheel or wheels, it is necessary to detect a degree of slippage of the driven wheel or wheels. In the following description, although a degree of slippage will sometimes be referred to as a slip amount or value or ratios, it is to be understood that there is no substantial difference in meaning therebetween. Such a slip value can basically be determined as a ratio of a rotational speed of a driven wheel to a vehicle speed. However, it is found considerably difficult to directly detect a vehicle speed and, if possible, a detector sensor is rendered so extremely expensive that automobiles cannot be generally provided with such a sensor. Accordingly, given usual automobiles with either front or rear wheels being driven wheels and the other being undriven wheels, an attempt has been made that a vehicle speed is determined from a rotational speed of the undriven wheel which is not subject to the influence of a driving torque of the engine and a slip value of the driven wheel is given on the basis thereof. In this case, a slip value of the driven wheel is given as a ratio of a rotational speed of the driven wheel to a rotational speed of the corresponding undriven wheel.

As this slip value is computed on the basis of only two parameters of the rotational speeds of the driven and undriven wheels, the slip value cannot be accurately detected particularly at cornering, thus making a precise slip control unlikely to be executed. At cornering, a locus of the front wheel deviates from a locus of the rear wheel. Given the front wheels being driven, merely comparing the rotational speeds of the driven front wheels with those of the undriven rear wheels may lead to the false judgment that the driven front wheels slip apparently at cornering even if both the front and rear wheels do not slip whatsoever. In other words, an apparent slip value of the driven front wheel becomes larger than that of the undriven rear wheel. This may be applicable to an automobile of the rear wheel drive type although, in this case, an apparent slip value is smaller to the contrary.

This problem arises because a vehicle speed is determined as a rotational speed of the undriven wheel for reasons of convenience although the vehicle speed should be eventually determined at a reference position of the vehicle body and because the driven wheels are apart from the reference position thereof. This allows a cornering radius of the reference position thereof to deviate from that of the driven wheel at cornering. Thus this problem may likewise occur even if an absolute vehicle speed against pavement could be detected using a vehicle speed sensor or at an automobile of four wheel drive type.

This phenomenon implies that a reduced amount of a torque to be applied to the driven wheels does not function as an optimum factor when the torque is reduced upon the slip control.

SUMMARY OF THE INVENTION

The present invention has the object to provide a slippage preventing apparatus for a vehicle adapted to implement the slip control to an optimum extent by compensating for a difference between a cornering radius of the reference position of the vehicle body representing a vehicle speed and a cornering radius of the driven wheel.

In order to achieve the object of the present invention, the slippage preventing apparatus is designed to correct an amount of torque to be reduced during the slip control on the basis of the difference in cornering radius.

In one aspect the present invention consists of the slippage preventing apparatus for a vehicle, which comprises driven wheel rotational speed detecting means for detecting a rotational speed of a driven wheel; vehicle speed detecting means for detecting a vehicle speed of the vehicle body on pavement at a predetermined reference position of the vehicle body; slip amount detecting means for detecting a slip amount or an amount of slippage of the driven wheel on pavement on the basis of the rotational speed of the driven wheel detected by the driven wheel rotational speed detecting means and the vehicle speed detected by the vehicle speed detecting means; cornering-radial difference detecting means for detecting a difference in cornering radius between a cornering radius at the predetermined reference position thereof and a cornering radius of the driven wheel; torque adjusting means for adjusting a torque to be applied to the driven wheel for a decrease or an increase in the torque; slippage controlling means for controlling slippage of the driven wheel by reducing the torque applied to the driven wheel by controlling the torque adjusting means when the slip amount detected by the slip amount detecting means exceeds a predetermined value; and correction means for correcting an amount of the torque to be reduced by the slippage controlling means on the basis of the difference in cornering radius in response to an output from the cornering-radial difference detecting means.

In another aspect the present invention consists of a slippage preventing apparatus for a vehicle with either one pair of front or rear wheels being driven and the other pair being undriven, which comprises driven wheel rotational speed detecting means for detecting a rotational speed of the driven wheel; undriven wheel rotational speed detecting means for detecting a rotational speed of the undriven wheel; cornering-radial difference detecting means for detecting a difference in cornering radius between the driven wheel and the undriven wheel; torque adjusting means for adjusting a torque to be applied to the driven wheel by increasing or decreasing the torque; slip amount detecting means for detecting a slip amount or an amount of slippage of the driven wheel on pavement on the basis of the rotational speed of the driven wheel detected by the driven wheel rotational speed detecting means and the rotational speed of the undriven wheel detected by the undriven wheel rotational speed detecting means; slip amount controlling means for controlling the slip amount detected by the slip amount detecting means by the torque adjusting means so as to reach a target slip amount; and correction means for correcting a control amount to be controlled by the slippage controlling means so as to compensate for the difference in cornering radius between the front and rear wheels detected by the cornering-radial difference detecting means.

These arrangements permit optimization of an amount of the torque to be reduced upon the slip control by compensating for the difference in cornering radius. In other words, this arrangement allows the rotational speed of the driven wheel to be corrected as a rotational speed at or approximate to the reference position of the vehicle body.

Such a correction using the difference in cornering radius may be made with other various factors which exert a reduced amount of torque to be reduced upon the slip control. A vehicle speed of the driven wheel is corrected as a vehicle speed corresponding to one at the reference position of the vehicle body. On the contrary, a vehicle speed at the reference position thereof may be corrected as a vehicle speed at the position of the driven wheel. In addition, in instances where a degree of slippage of the driven wheel is controlled so as to reach a target slip amount, the target slip amount may be corrected on the basis of the difference in cornering radius. Furthermore, in instances where a rotational speed of the driven wheel is controlled to become a target rotational speed corresponding to the target slip amount, the target rotational speed may be corrected on the basis of the difference in cornering radius.

The torque to be applied to the driven wheel or wheels may be preferably reduced by both or either of a decrease in an output of the engine and/or an application of a braking force to the driven wheel or wheels. As the braking force is generally applied separately and independently to each individual driven wheel, thus the braking forces to be applied to the left-hand and right-hand driven wheels can be corrected separately to each other in accordance with the difference in cornering radius between the driven wheels.

The difference in cornering radius therebetween may be detected preferably on the basis of steered angles of the steering wheel. This is extremely advantageous because the steered angles of the steering wheel can be detected with accuracy and ease and the detected steered angles thereof automatically lead to determination of the difference in cornering radius.

It is to be noted here that a correction on the basis of the difference in cornering radius can be done in stepwise or continuous manner.

The above and other objects, features and advantages of the present invention will become apparent from the description of preferred embodiments which will be hereinafter described in detail with reference to the accompanying drawings.

BRIEF DESCRIPTION OF THE DRAWINGS

FIGS. 3 through 6 are flowcharts each showing a control manner according to the present invention.

FIGS. 18 through 21 are flowcharts showing a seventh embodiment according to the present invention.

DETAILED DESCRIPTION OF THE PREFERRED EMBODIMENTS

The present invention will be described by way of examples in conjunction with the drawings attached hereto.

In the following embodiment, it is to be understood that a slippage of the driven wheel or wheels is controlled in such two ways as decreasing a torque to be generated by the engine and applying a braking force from the brake.

Outline of Overall Construction

Figure 1:
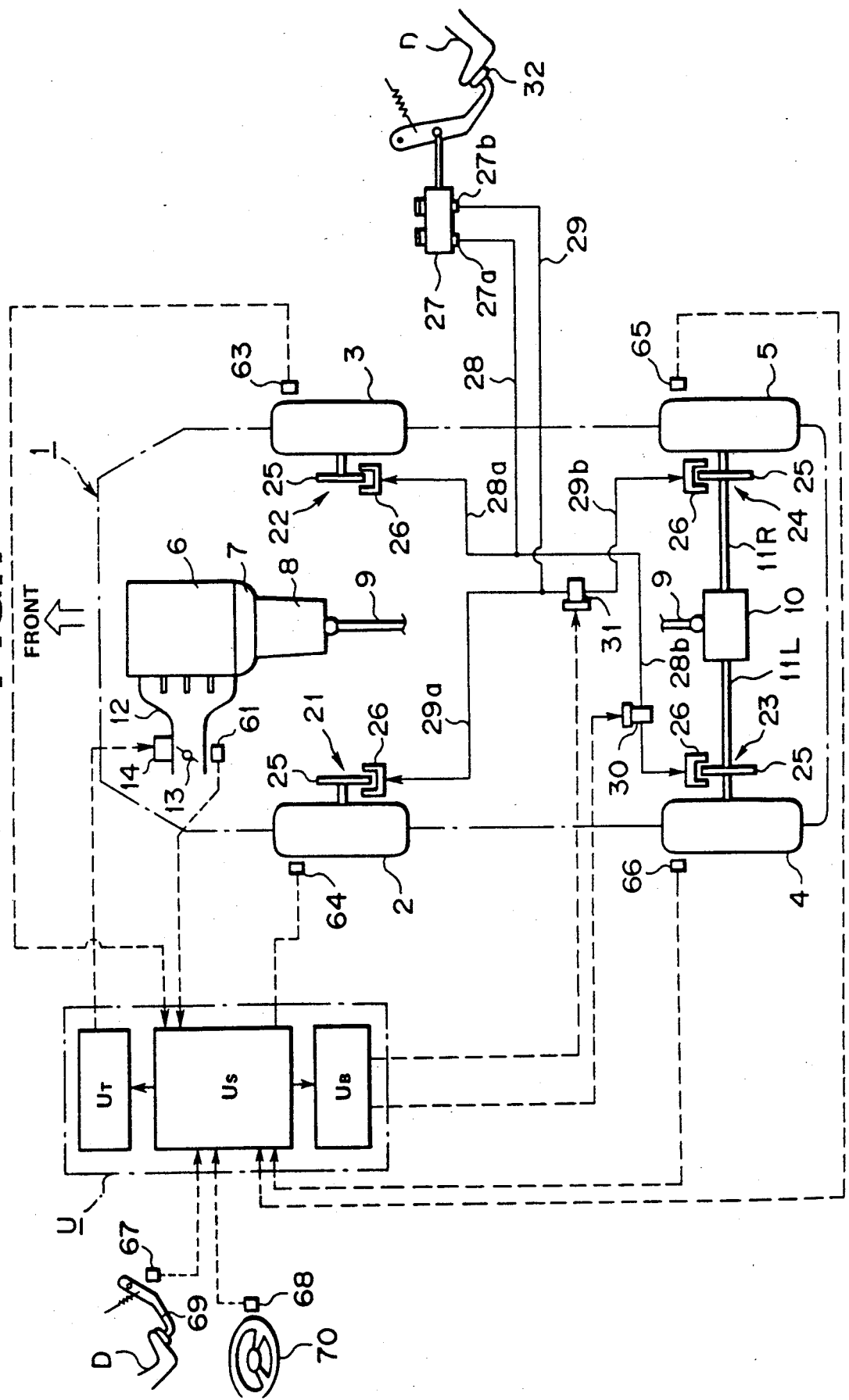
FIG. 1 is a diagram showing one example of the slippage preventing apparatus according to the present invention.

In FIG. 1, an automobile 1 comprises left-hand and right-hand undriven front wheels 2 and 3 and left-hand and right-hand driven rear wheels 4 and 5, respectively. In this embodiment, the automobile 1 is of the FR (front engine rear wheel drive) type in which an engine 6 as a source of power is mounted in a forward portion thereof and a torque generated by the engine 6 is transmitted through a clutch 7, a transmission 8, a propeller shaft 9, a differential gear 10 and left-hand and right-hand drive shafts 11L and 11R to the respective left-hand and right-hand driven rear wheels 4 and 5.

The engine 6 is shown to implement the load control, that is, a control of the output torque, by a throttle valve 13 mounted on an intake air passage 12. More specifically, the engine 6 is a gasoline engine of the type that the output torque varies with an amount of intake air. The amount of the intake air may be controlled by the throttle valve 13 that is electromagnetically opened or closed by a throttle actuator 14. Although a stepping motor is used as the throttle actuator 14 in this embodiment, there may be employed an appropriate means that may be electromagnetically controlled by a DC motor or by fluid pressures such as hydraulic pressures.

The wheels 2 to 5 are provided with a brake 21, 22, 23 and 24, respectively, and the brakes 21 to 24 may be each a disk brake. As is known, the disk brake comprises a disk 25 rotatable with the corresponding wheel and a caliper 26. The caliper 26 is provided with a brake pad and a wheel cylinder, and the brake pad depresses the disk 5 by a braking force corresponding to an amount of a braking liquid pressure supplied to the wheel cylinder.

A master cylinder 27 functioning as a source of generating the braking liquid pressure may be of the tandem type having two discharge outlets 27a and 27b. A brake pipe 28 extending from the discharge outlet 27a is branched at its middle portion along the line into branch pipes 28a and 28b, the branch pipe 28a being connected to the wheel cylinder of the brake 22 for the right-hand front wheel 3 and the branch pipe 28b being connected to the wheel cylinder of the brake 23 for the left-hand rear wheel 4. A brake pipe 29 extending from the discharge outlet 27b is branched at its middle portion along the line into branch pipes 29a and 29b, the branch pipe 29a being connected to the wheel cylinder of the brake 21 for the left-hand front wheel 2 and the branch pipe 29b being connected to that of the brake 24 for the right-hand rear wheel 5. As described hereinabove, the brake pipe system may be of a so-called 2-system X type. To the branch pipes 28a and 29a for the respective brakes 23 and 24 of the driven rear wheels 4 and 5 are connected, respectively, hydraulic pressure control valves 30 and 31 of the electromagnetic type as means for controlling a braking force. The braking liquid pressure generated by the master cylinder 27 corresponds to an amount or force of a brake pedal 32 stepped down by the operator D.

Braking Pressure Regulating Circuit

Figure 2:
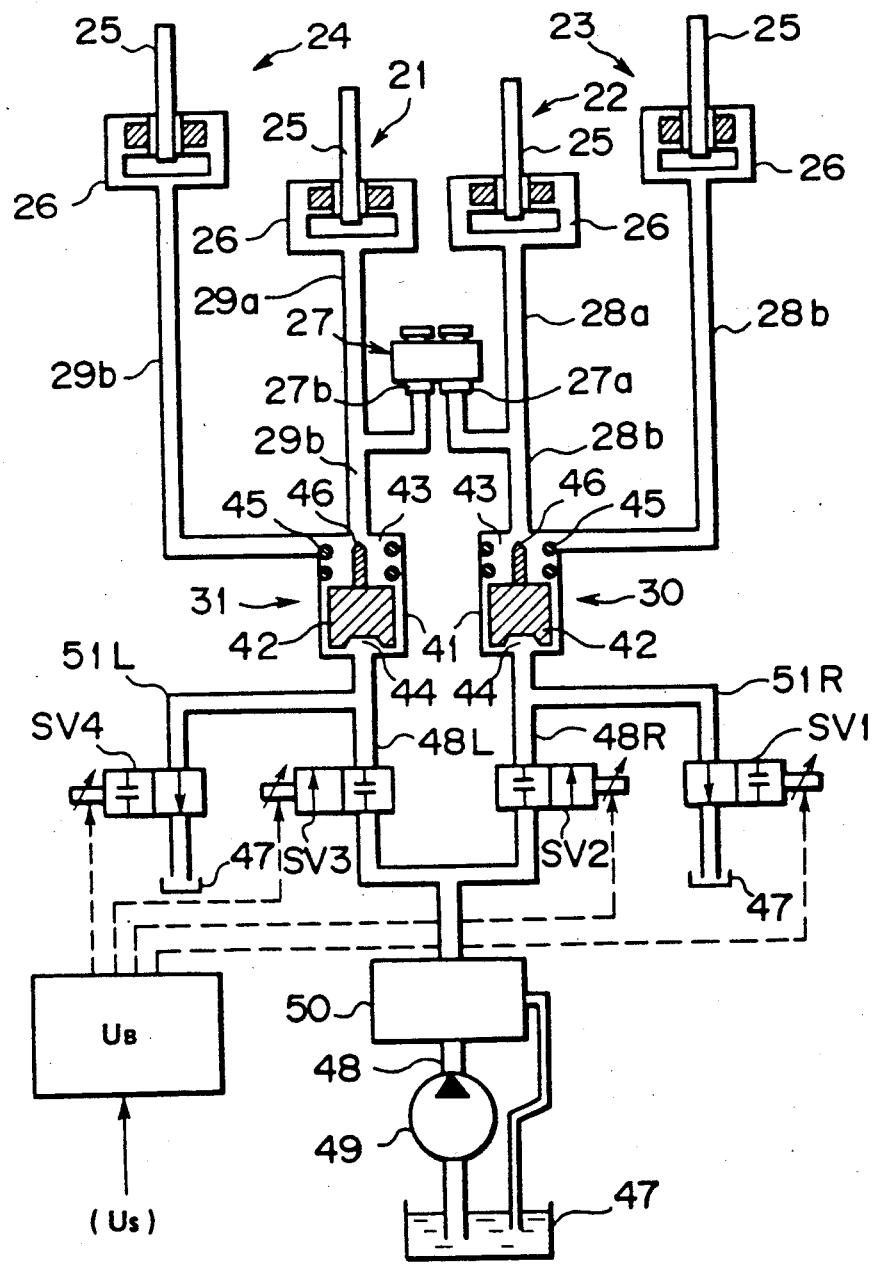
FIG. 2 is a diagram showing one example of a braking liquid pressure control circuit.

As shown specifically in FIG. 2, the liquid pressure control valves 30 and 31 are provided each with a cylinder 41 and a piston 42 inserted slidably in the cylinder 41. The piston 42 divides the cylinder 41 into and defines a volume-variable chamber 43 and a control chamber 44. The volume-variable chambers 43 of the liquid pressure control valves 30 and 31 work as a passage of the braking liquid pressure to the brakes 23 and 24 from the master cylinder 27, respectively. Accordingly, the volume of the volume-variable chamber 43 can be varied by adjusting a position of displacement of the piston 42, thereby generating the braking liquid pressure to the brakes 23 and 24 and at the same time increasing, decreasing or retaining the braking liquid pressure generated.

The piston 42 is constantly actuated by a return spring 45 so as to cause the volume in the volume-variable chamber 43 to be increased. The piston 42 is integrated with a check valve 46 that in turn is designed to close its inlet side to the volume-variable chamber 43 when the piston 42 is displaced in such a manner that the volume in the volume-variable chamber 43 is decreased. This arrangement allows the braking liquid pressure generated in the volume-variable chamber 43 to work only on the brakes 23 and 24 for the driven rear wheels 4 and 5 and not to act on the brakes 21 and 22 for the undriven front wheels 2 and 3, respectively.

The position of displacement of the piston 42 is adjusted by regulation of the hydraulic pressure against the control chamber 44. More specifically, a supply pipe 48 extending from a reservoir 47 is branched at a middle portion thereof along the line into two branch pipes 48L and 48R, the branch pipe 48R being connected to the control chamber 44 for the valve 30 and the other branch pipe 48L being connected to the control chamber 44 for the valve 31. To the supply pipe 48 are connected a pump 49 and a relief valve 50. To the branch pipes 48L and 48R are connected supply valves SV3 and SV2, respectively, each consisting of an electromagnetically opening or closing valve. The control chamber 44 are additionally connected to the reservoir 47 through discharge piped 51L and 51R, to which discharge valve SV1 and SV4, respectively, each consisting of an electromagnetically opening or closing valve, are connected.

When the braking is effected using the hydraulic pressure regulating valve 30 or 31 or during the slip control, on the one hand, the check valve 46 acts in such a manner that the brake does not basically work by means of operation of the brake pedal 32. When the braking liquid pressure to be generated by the hydraulic pressure regulating valve 30 or 31 is small or when the pressure is being decreased, on the other hand, the brake is allowed to work as the brake pedal 32 is stepped down. When no braking liquid pressure for the slip control is generated by the hydraulic pressure regulating valves 30 and 31, the usual braking action that arises from operation of the brake pedal 27 is caused to work because the master cylinder 27 is allowed to be communicated with the brakes 23 and 24.

A control of each of the valves SV1 to SV4, inclusive, is implemented by opening or closing by a brake control unit $U_B$ as will be described more in detail below. The table below demonstrates relationships of a state of the braking liquid pressure against the brakes 23 and 24 with operation of each of the valves SV1 to SV4, inclusive.

TABLE

| Brakes | Pressure | SV1 | SV2 | SV3 | SV4 |
|---|---|---|---|---|---|
| 24 | Increase | — | — | Opened | Closed |
|  | Decrease | — | — | Closed | Opened |
|  | Retain | — | — | Closed | Closed |
| 23 | Increase | Closed | Opened | — | — |
|  | Decrease | Opened | Closed | — | — |
|  | Retain | Closed | Closed | — | — |

Outline of Control Units

Referring to FIG. 1, reference symbol U denotes generally a control unit group that consists roughly of a brake control unit $U_B$, a throttle control unit $U_T$ and a slip control unit $U_S$. The brake control unit $U_B$ is designed so as to control the opening or closing of each of the valves SV1 to SV4, inclusive, as have been described above, on the basis of signals from the slip control unit $U_S$. The throttle control unit $U_T$ is to control the driving of the throttle actuator 14 on the basis of signals from the slip control unit $U_S$.

The slip control unit $U_S$ comprises a computer of the digital type such as a microcomputer. To the slip control unit $U_S$ are given signals output from each of sensors (or switches) 61 and 63 to 68, inclusive. The sensor 61 is to detect a degree of opening of the throttle valve 13. The sensors 63 and 64 are to detect rotational speeds of the respective left-hand and right-hand undriven front wheels 2 and 3, or a vehicle speed, and the sensors 65 and 66 are to detect rotational speeds of the respective left-hand and right-hand driven rear wheels 4 and 5. The sensor 67 is to detect an amount of operation of an accelerator 69, that is, a degree of accelerator opening. The sensor 68 is to detect an amount of operation of a steering wheel 70, that is, a steered angle thereof. The sensors 64, 65 and 66 may each comprise, for example, a pickup, and the sensors 61, 67 and 68 may each comprise, for example, a potentiometer.

The slip control unit $U_s$ basically comprises a CPU, ROM, RAM, and CLOCK. It is further provided with input and output interface as well as A/D or D/A converters in accordance with input or output signals. These are the same as a conventional one where a microcomputer is employed so that detailed description thereon will be omitted herein for the brevity of description. Maps and so on which will be described herein, are stored in the ROM of the control unit $U_s$.

The control manner of the control unit group U will be described in order. A slip value or amount S for the driven wheels may be defined by the following relationship (1):

$$S = \frac{WD}{WL} \qquad (1)$$

where
WD is an average of rotations of the left-hand and right-hand driven wheels 4 and 5; and
WL is an average of rotations of the left-hand and right-hand undriven wheels 2 and 3 (a vehicle speed).

Figure 10:
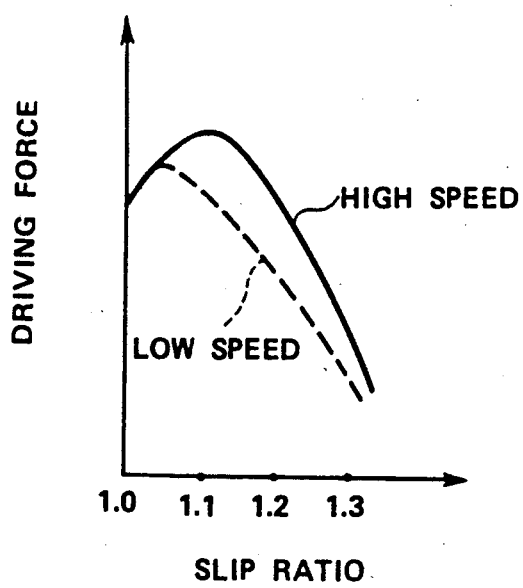
FIG. 10 is a graph showing the relationship of slip ratios vs. driving forces.

It is noted herein that a driving force of the driven wheels—a grip on pavement—becomes the maximum in general cases when the slip value S ranges from approximately 1.04 to 1.1 as shown in FIG. 10.

Throttle Control

Figure 9:
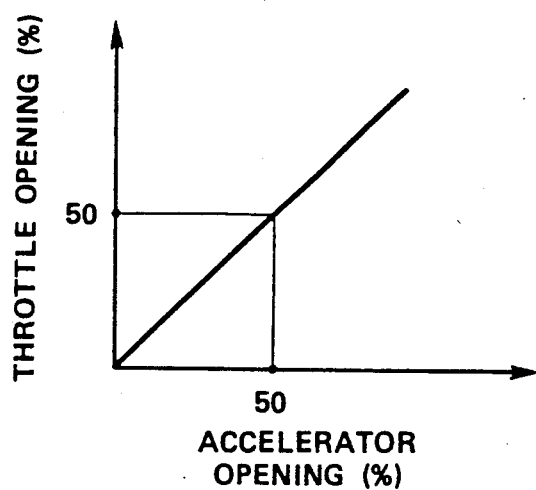
FIG. 9 is a graph showing an example of the relationship of accelerator openings vs. throttle openings at the time of no slip control.

The throttle control unit $U_T$ is designed to establish a feedback of the throttle actuator 14 for the throttle valve 13 so as to give a target throttle opening. When no slip control is implemented during the throttle control, the target throttle opening is regulated so as to be proportional by a 1-to-1 ratio to an amount of operation of the accelerator 69 operated by the operator D. One example of the relationship of the throttle opening with the accelerator opening at this time is shown in FIG. 9. It is also noted herein that the throttle control unit $U_T$ is designed to implement the throttle control in such a manner that a target throttle opening Tn operated by the slip control unit $U_S$ is given at the time of the slip control without following the characteristics as demonstrated in FIG. 9.

The feedback control of the throttle valve 13 using the throttle control unit $U_T$ is designed in this embodiment to be implemented by way of the PI-PD control so as to compensate for a variation in response speeds of the engine 6. More specifically, the opening of the throttle valve 13 is subjected to the PI-PD control during the slip control for the driven wheels in such a manner that the current slip value calculated by the above formula (1) corresponds with the target slip value. In other words, as will be apparent from the above formula (1), the throttle opening of the throttle valve 13 is controlled to satisfy the following relationship (2):

$$WET = WL \times ST \qquad (2)$$

where
WET is a target number of rotations of the driven wheels; and
ST is a target slip value.

Figure 8:
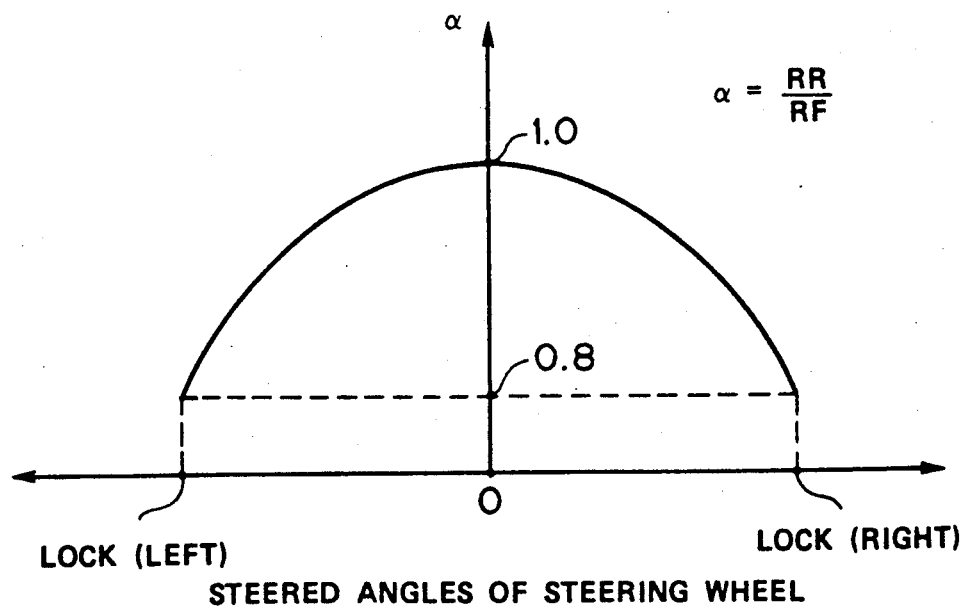
FIG. 8 is a graph showing the relationship between steered angles of the steering wheel and correction coefficients.

In this embodiment, it is noted that the slip value is corrected in accordance with the steered angle of the steering wheel by setting the target rotational number WET in the formula (2) above as containing a correction in accordance with the steered angle of the steering wheel. More specifically, a final target driven wheel rotational speed WET (for the PI-PD control for the engine) used in the above formula (2) is given by first setting the target slip value ST in accordance with the vehicle speed or the rotational speed of the undriven wheel, then calculating a basic target driven wheel rotational speed by multiplying the target slip value ST by the vehicle speed, and further multiplying the basic target driven wheel rotational speed with correction coefficient $\alpha$ (as shown in FIG. 8) in accordance with the steered angle of the steering wheel.

Brake Control

During the time of the slip control, a feedback of the left-hand and right-hand driven wheels 4 and 5 is established using the control unit $U_B$ so as to allow their respective rotations or slippage to separately become a predetermined target slip value ST. It is possible that this slip value becomes a value different from the target slip value ST for the engine. In other words, the brake control is implemented by way of the feedback control such that a driven wheel rotational number WBT is determined by the following relationship (3):

$$WBT = WL \times ST \qquad (3)$$

It is to be understood here that the driven wheel rotational number WBT in the formula (3) contains a correction in accordance with the steered angle of the steering wheel as the target driven wheel rotational speed WET in the formula (2) above.

In this embodiment, the feedback is established by means of the I-PD control so as to satisfy the relationship as shown in the above formula (3). More specifically, an amount of operation of the brake Bn—an amount of operation of the piston 44 in the valve 30 or 31—is subjected to the I-PD operation. It is noted that the braking liquid pressure is decreased when the operation amount of the brake Bn is larger than zero, viz., when it is positive, on the one hand, and the braking liquid pressure is increased when the operation amount of the brake Bn is equal to or lower than zero, on the other hand. The braking liquid pressure is increased or decreased by opening or closing the valves SV1 through SV4 as have been described above. Speeds of increasing or decreasing the braking liquid pressures are adjusted by ratios of the opening time to the closing time (duty ratios) of the valves SV1 to SV4, inclusive, that is, by means of the duty control. It is further noted herein that the duty control is conducted so as to be proportional to the absolute value of the operation amount of the brake Bn given by the relationship (3) above. Accordingly, the absolute value of the brake operation amount Bn leads to a proportion to a speed of a variation in the braking liquid pressures. On the contrary, the duty ratio determining the speed of increasing or decreasing the braking liquid pressures indicates the brake operation amount Bn.

One example of the slip control according to the present invention will be described below in conjunction with the flow charts attached hereto.

FIG. 3 (Main Routine)

Figure 7:
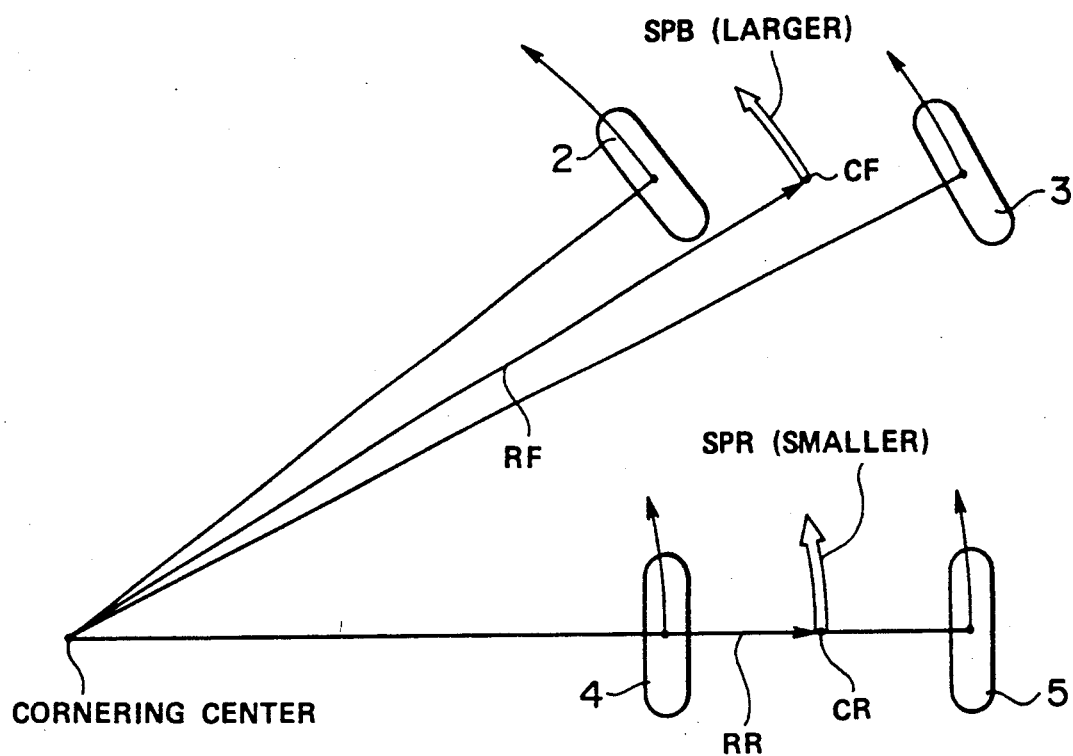
FIG. 7 is a diagram showing the difference in cornering radius between the front and rear wheels.

As the key switch and the starter switch are turned on to thereby start the engine 6, the process is started from the step P1. At step P1, the overall system is initialized. At step P2, an output from each of the sensors 61, and 63 through 68 are read in. At step P3, a basic throttle opening TOB is computed from a map, as shown in FIG. 9, on the basis of the read-in data in accordance with an accelerator opening and, at step P4, a rotational speed of each of wheels 2 through 5 is computed. Then, at step P5, an average rotational speed SPB of the undriven wheels 2 and 3 is computed by adding the rotational speed of the left-hand undriven wheel 2 to that of the right-hand undriven wheel 3 and then dividing the sum by 2. This average rotational speed SPB is indicated in FIG. 7 as a rotational speed at a middle position CF of a virtual axis between the respective left-hand and right-hand front wheels 2 and 3, the position CF thereof having a rotational radius RF from the center of cornering, as shown in FIG. 7.

Step P6 computes a correction coefficient $\alpha$ in accordance with the current steered angle of the steering wheel from the map shown in FIG. 8. It is to be noted here that this correction coefficient $\alpha$ is for the purpose to subsequently correct apparent slip values for the left-hand and right-hand driven rear wheels 4 and 5.

At step P7, the target slip value ST for the driven wheels is decided by the basic vehicle speed SPB calculated in step P5. This decision is made on the basis of a map prepared and stored in advance in such a manner that the target slip value ST for the driven wheel gets larger continuously as the basic vehicle speed SPB gets faster.

Step P8 computes a basic target driven wheel rotational speed WB by multiplying the basic vehicle speed SPB by the target slip value ST computed at the step P7.

At step P9, a final target driven wheel rotational number WF is computed by multiplying the basic target driven wheel rotational speed WB computed at the step P8 by the correction coefficient $\alpha$ computed at the step P6. The final target driven wheel rotational number WF is used as the target driven wheel rotational number WET in the formula (2) above and the driven wheel rotational number WBT in the formula (3) above.

The flow then proceeds to step P10 for the slip control by the engine and step P11 for the slip control by the brake, as will be described more in detail.

Figure 4:
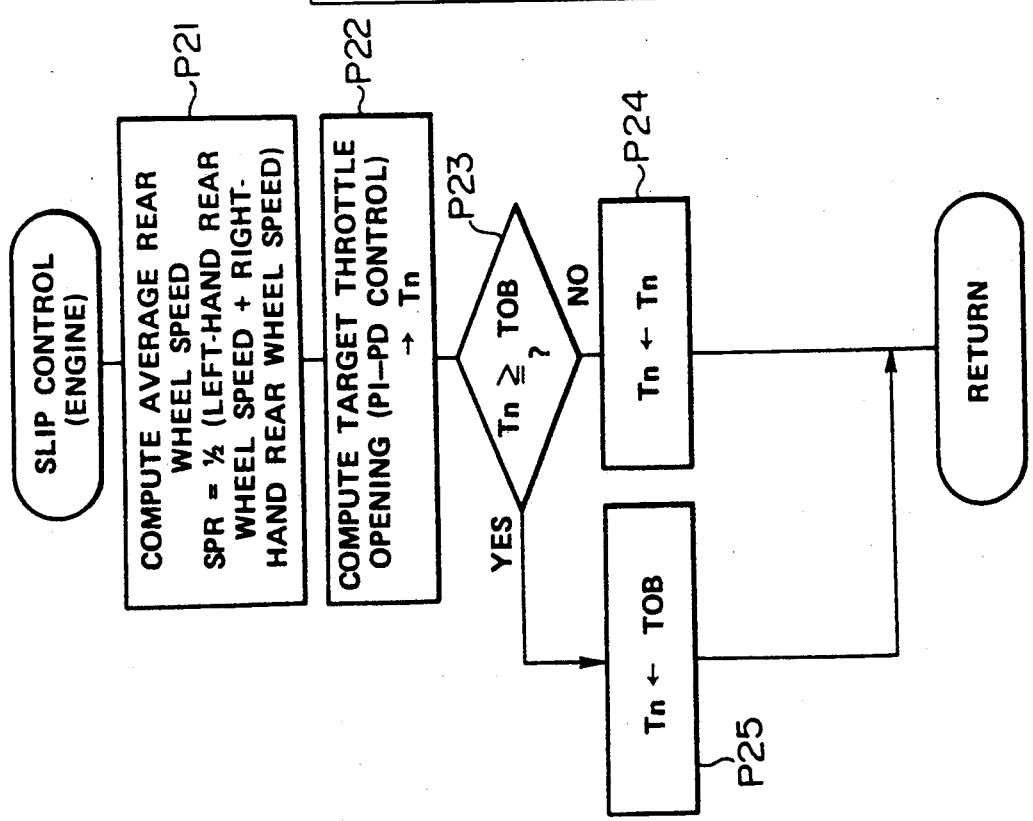

FIG. 4 (Slip Control by Engine)

FIG. 4 illustrates the slip control by the engine and corresponds to the step P10 shown in FIG. 3.

At step P21, an average driven wheel rotational speed SPR is computed by adding a rotational speed of the left-hand driven wheel 4 to that of the right-hand driven wheel 5 and then dividing the sum by 2. It is to be noted that the average driven wheel rotational speed SPR corresponds to a rotational speed at a middle position CR of a virtual axis between the respective left-hand and right-hand driven rear wheels 4 and 5, the position CR thereof having a rotational radius RR from the center of cornering, as shown in FIG. 7.

Step P22 computes a target throttle opening Tn necessary for the average driven wheel rotational speed SPR to reach the target slip value ST (final target rotational number WF) by means of the PI-PD control.

A step P23, it is judged whether or not the target throttle opening Tn computed at the step P22 is larger than the basic throttle opening $TO_B$ computed at the step P3 above. When NO at the step P23, on the one hand, the implementation of the slip control is required so that the flow advances to step P24 where the target throttle opening Tn computed at the step P22 is set intactly as a final target throttle opening Tn for the slip control. When YES at the step P23, on the other hand, the basic throttle opening TOB is set as a final target throttle opening Tn for ordinary driving.

Figure 5:
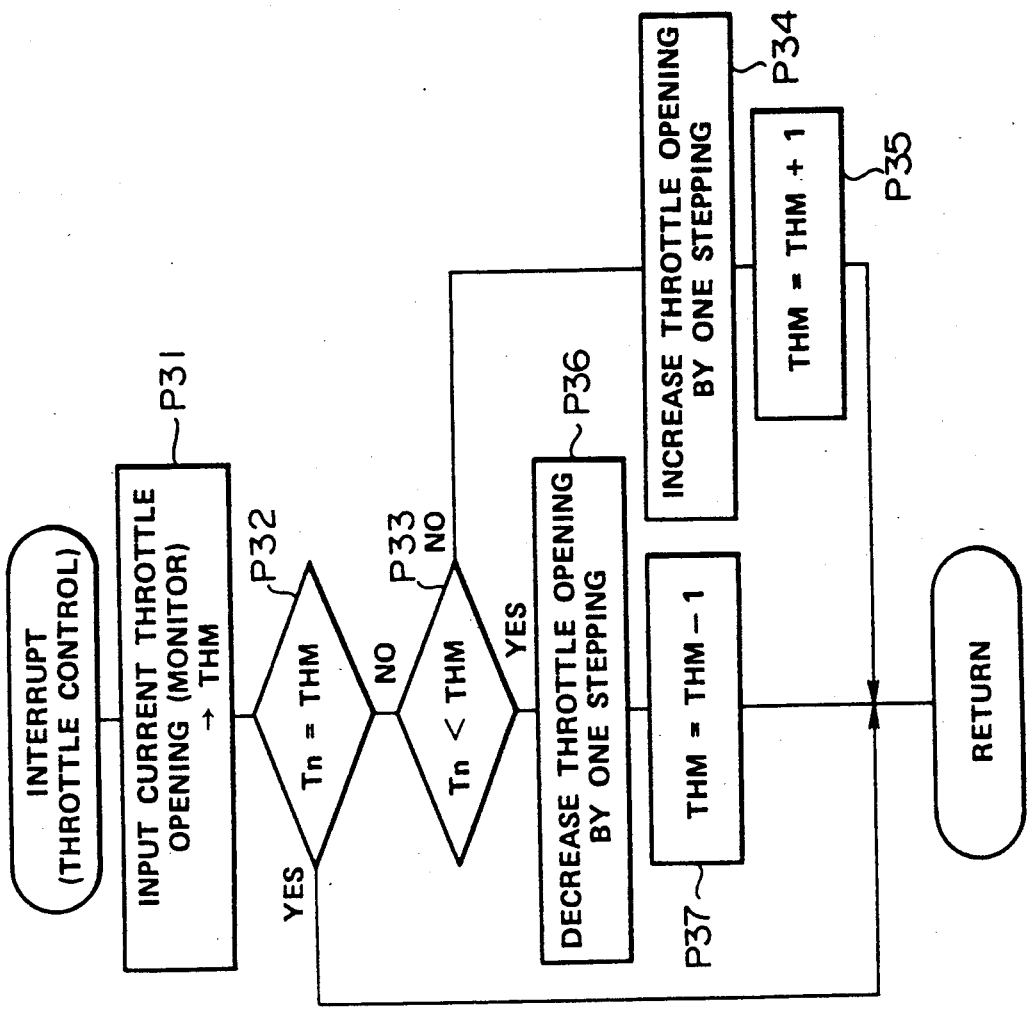

FIG. 5 (Throttle Control)

Figure 6:
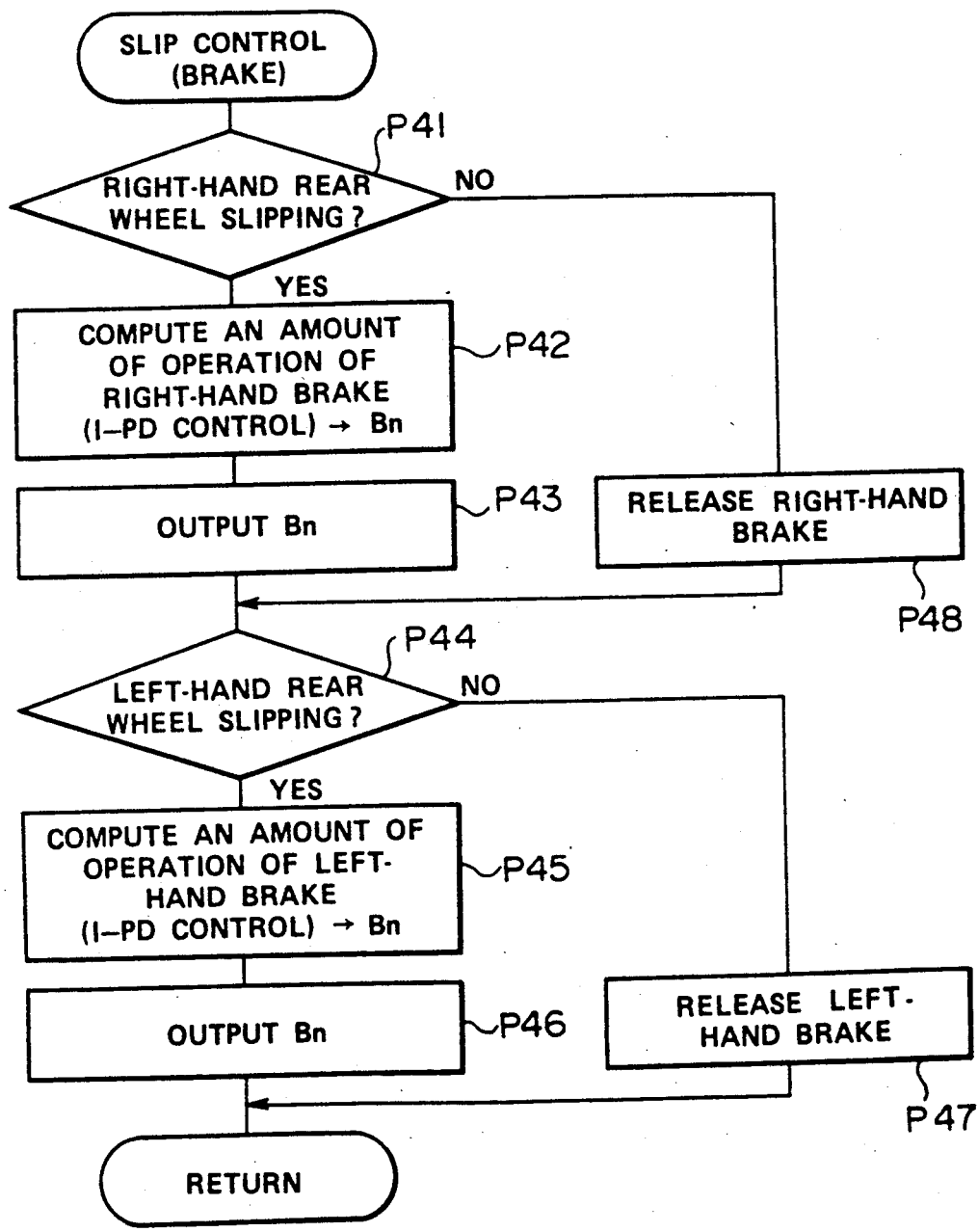

The flow chart shown in FIG. 6 may be designed to interrupt, for example, every 1 msec into the flow chart shown in FIG. 3. The processing in FIG. 5 is effected to realize the final target throttle opening Tn set at the step P24 or P25 in FIG. 4.

At step P31, the current throttle opening is read in from a monitor as the stepping number THM of the stepping motor as the throttle actuator 14.

At step P32, it is then judged whether or not the final target throttle opening Tn is equal to the current throttle opening THM. When YES at the step P32, no alteration of the throttle opening is required so that the control is finished.

When NO at the step P32, the flow proceeds to step P33 and it is judged therein whether the final target throttle opening Tn is smaller than the current throttle opening THM. If it is judged NO at the step P33, the throttle opening THM is increased by one stepping at step P34 and the stepping number THM is counted up by one at step P35, on the one hand, and, if YES at the step P33, it is decreased by one stepping at step P36 and the stepping number THM is counted down by one at step P37, on the other hand. The counts at steps P35 and P37 are then read in at the step P31.

FIG. 6 (Slip Control by Brake)

FIG. 6 illustrates the slip control by the brake and corresponds to the step P11 in FIG. 3.

Step P41 judges whether or not a predetermined degree of slippage occurs on the right-hand driven rear wheel 5. This judgment at the step P41 is made to see whether or not the rotational speed of the right-hand rear wheel 5 is equal to or larger than 125% of the vehicle speed. If YES at the step P41, the flow advances to step P42 where the operation amount Bn of the right-hand brake operated by means of the I-PD control is computed. Then, at step P43, the operation amount Bn computed at the step P42 is output whereby the braking force in an amount corresponding to the output operation amount Bn is applied to the right-hand driven rear wheel 5. If it is judged NO at the step P41, the flow proceeds to step P48 where the right-hand brake is forced to be released.

After the steps P43 and P48, the flow proceeds to step P44 and it is judged therein whether or not a predetermined degree of slippage occurs on the left-hand driven rear wheel 4 in substantially the same manner as at the step P41. When YES at the step P44, on the one hand, the operation amount Bn of the left-hand brake operated by means of the I-PD control is computed at step P45 and the resulting operation amount Bn is output at step P46, whereby the braking force in an amount corresponding to the output operation amount Bn is applied to the left-hand driven rear wheel 5. When NO at the step P44, on the other hand, the left-hand brake is forced to be released at step P47 and the remainder of the braking liquid pressure is gradually removed so as to cause no dragging phenomenon.

Second Embodiment

Figure 11:
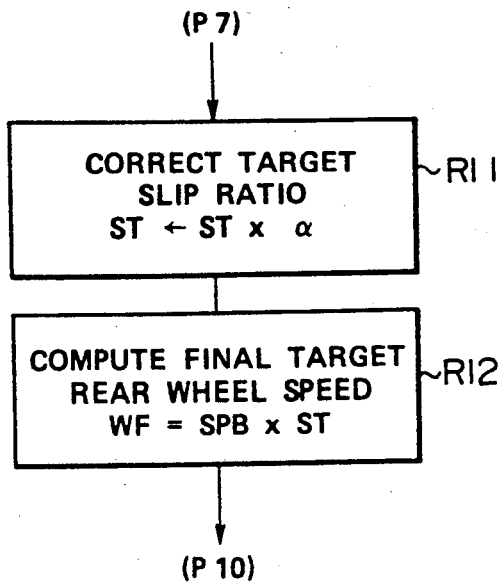
FIG. 11 is a flowchart showing an essential portion of a second embodiment according to the present invention.
Figure 12:
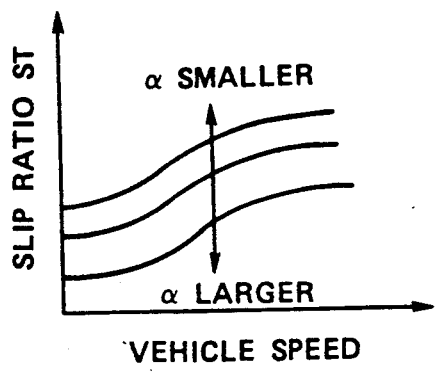
FIG. 12 is a map corresponding to FIG. 11.

FIGS. 11 and 12 each shows a second embodiment of the slippage preventing apparatus according to the present invention in which this embodiment relates to an automobile of the rear wheel drive type.

In this embodiment, a target slip ratio ST is corrected using a steered angle of the steering wheel. Referring to FIG. 11, it is noted that steps R11 and R12 therein are substituted for the steps P8 and P9 in FIG. 3. At step R11, a new target slip ratio ST is given by multiplying the slip ratio ST set at the step P7 in FIG. 3 by a correction coefficient α corresponding to a steered angle of the steering wheel. Then at step R12, a final target rear wheel rotational number WF is computed by multiplying the new slip ratio ST corrected at the step R11 by the basic vehicle speed SPB.

As a substitution for the map as shown in the step P7 of FIG. 3, the target slip ratio ST can be set using the correction coefficients α corresponding to the steered angles of the steering wheel as a parameter. In this case, a slip ratio ST corresponding to the steered angle is selected from a map as shown in FIG. 12 in order to determine the slip ratio ST to be used in the step P8 of FIG. 3.

Third Embodiment

Figure 13:
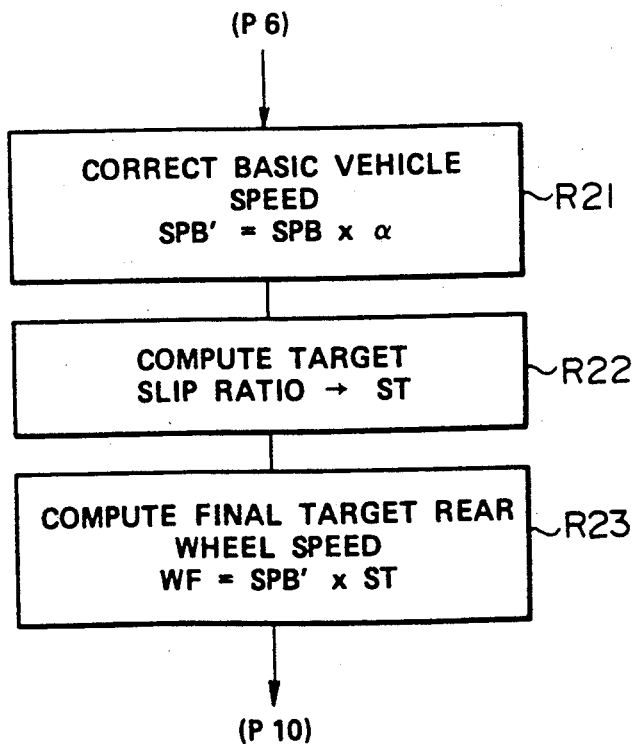
FIG. 13 is a flowchart showing an essential portion of a third embodiment according to the present invention.

FIG. 13 relates to a third embodiment according to the present invention. This embodiment is also directed to the rear wheel drive type like the second embodiment and relates to correction of the basic vehicle speed SPB in accordance with steered angles of the steering wheel.

As shown in FIG. 13, steps R21 through R23 are substituted for the steps P7 through P9 in FIG. 3. In this embodiment, a corrected new basic vehicle speed SPB' is obtained at step R21 by multiplying the basic vehicle speed SPB computed at the step P5 in FIG. 3 by a correction coefficient α corresponding to the steered angle thereof. Then at step R22, a target slip ratio ST is computed in the same manner as at the step P7 in accordance with the basic vehicle speed SPB prior to correction at step R21. At step R23, a final target rear wheel speed WF is computed by multiplying the corrected new basic vehicle speed SPB' obtained at the step R21 by the target slip ratio ST obtained at the step R22.

It is to be noted herein, however, that the corrected basic vehicle speed SPB' computed at the step R21 may be used for determining the slip ratio ST at the steps R22 and P7. In this case, as the basic vehicle speed at the step R23 may be used the basic vehicle speed SPB prior to correction.

Fourth Embodiment

Figure 14:
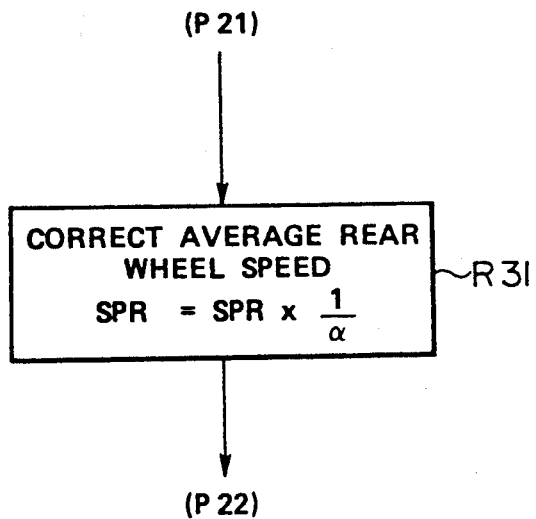
FIG. 14 is a flowchart showing an essential portion of a fourth embodiment according to the present invention.

FIG. 14 shows a fourth embodiment according to the present invention in which it is directed to an automobile of the rear wheel drive type. This embodiment relates to correction of a rotational speed of the rear wheel on the basis of a steered angle of the steering wheel.

As shown in FIG. 14, step R31 is added between the steps P21 and P22 in FIG. 4 and a corrected new average rear wheel rotational speed SPR can be obtained by multiplying an average rear wheel rotational speed SPR computed at the step P21 by a reciprocal number of the correction coefficient α corresponding to the steered angle of the steering wheel. Operation at step P22 is then made on the basis of the average rear wheel rotational speed SPR corrected at the step R31.

It is to be noted herein that step P9 is removed from FIG. 3 and the target basic rear wheel speed WB at the step P8 is set intactly as a final target rear wheel rotational number WF. It is further noted that the corrected value SPR computed at the step R31 is used as the average driven wheel rotational speed WD in the formulas (2) and (3) above.

Fifth Embodiment

Figure 15:
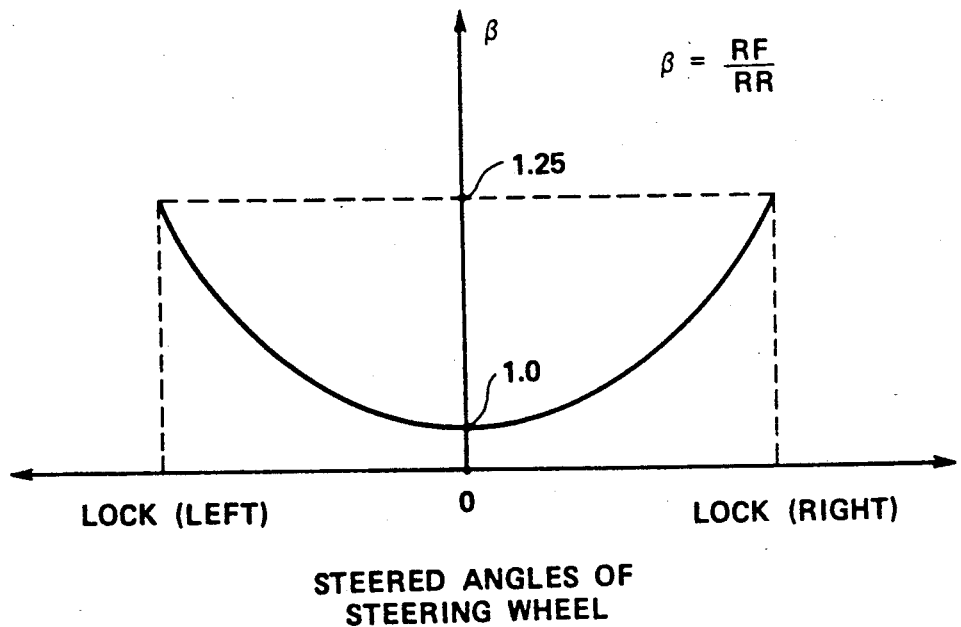
FIG. 15 is a graph showing correction coefficients vs. steered angles of the steering wheel for an automobile of front wheel drive type as a fifth embodiment according to the present invention.

FIG. 15 shows a fifth embodiment according to the present invention in which it relates to an automobile whose front wheels are driven and whose rear wheels are undriven.

In this embodiment, those described in FIG. 15 is used as a correction coefficient β corresponding to steered angles of the steering wheel. The correction coefficient α may be used as it is for the correction coefficient β.

Sixth Embodiment

Figure 16:
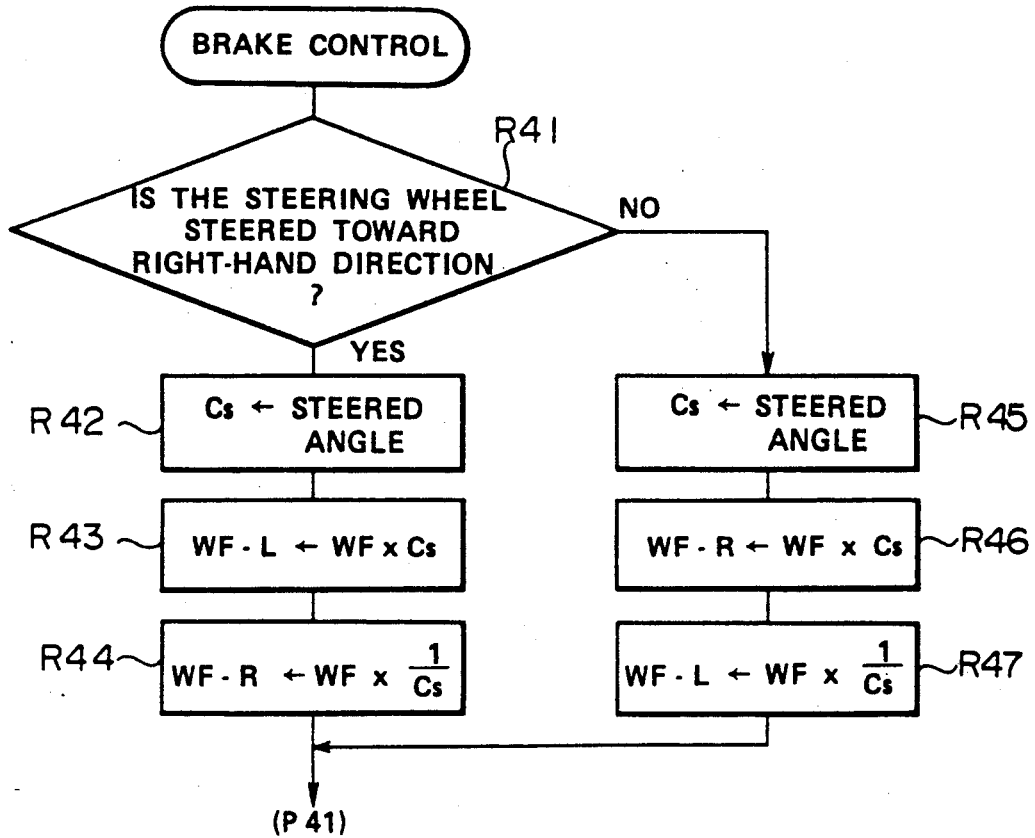
FIGS. 16 and 17 are a flowchart and a map, respectively, showing a sixth embodiment according to the present invention.
Figure 17:
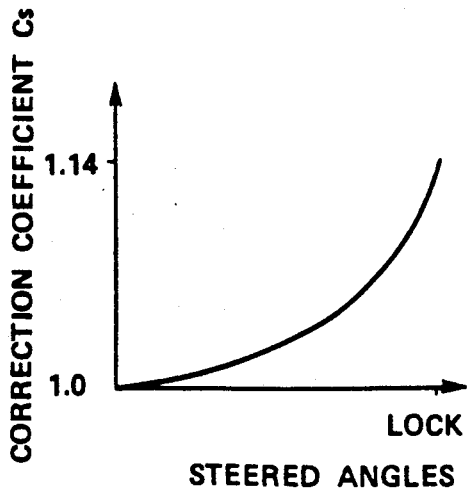

FIGS. 16 and 17 show a sixth embodiment according to the present invention, in which it relates to an vehicle with the front wheels 2 and 3 being undriven and the rear wheels 4 and 5 being driven. In this embodiment, the left-hand and right-hand driven rear wheels 4 and 5, respectively, are designed such that there is given a difference between a braking force to be applied to the former from that to the latter. Such a difference is given by considering that a difference in cornering radius may arise more or less between the left-hand and right-hand driven wheels 4 and 5 at cornering and that the braking force can be applied separately to the driven wheels 4 and 5. It is to be noted, however, that the previous embodiments are designed to determine braking forces to be applied to the left-hand and right-hand driven wheels 4 and 5 at a middle position (a position as referred to as CR in FIG. 7) between the driven wheels 4 and 5 as a reference position.

In this embodiment, the processing as shown in FIG. 16 is effected prior to the step P41 in FIG. 6. At step R41, it is judged whether or not the steering wheel is steered toward the right-hand direction. If YES at step R41, a correction coefficient $C_s$ (larger than 1) corresponding to the steered angle of the steering wheel is read in from the map shown in FIG. 17 at step R42. Then at step R43, a final target rotational speed WF·L of the left-hand rear wheel 4 is computed by multiplying the final target rear wheel rotational speed WF obtained at the step P9 in FIG. 3 by the above correction coefficient $C_s$. At step R44, a final target rotational speed WF·R of the right-hand rear wheel 5 is then computed by multiplying the final target rear wheel rotational speed WF at the step P9 by a reciprocal number of the correction coefficient $C_s$. As is apparent from the above description, the final target rotational speed WF·L of the left-hand driven wheel 4 having a larger cornering radius is set larger than the final target rotational speed WF·R of the right-hand driven wheel 5 having a smaller cornering radius at cornering toward the right-hand direction.

If NO at step R41, a correction coefficient $C_s$ (larger than 1) corresponding to the steered angle thereof is read in at step R45 from the map shown in FIG. 17 and then a final target rotational speed WF·R of the right-hand rear wheel 5 is computed at step R46 by multiplying the final target rear wheel rotational speed WF obtained at the step P9 in FIG. 3 by the above correction coefficient $C_s$. Then at step R47, a final target rotational speed WF·L of the left-hand driven wheel 4 is then computed by multiplying the final target rear wheel rotational speed WF obtained at step P9 by a reciprocal number of the correction coefficient $C_s$. In this case, it is apparently understood that the final target rotational speed WF·R is set larger than the final target rotational speed WF·L to the contary.

Seventh Embodiment

FIGS. 18 to 21 show a seventh embodiment according to the present invention in which it relates to an automobile of four wheel drive type such that the front wheels 2 and 3 as well as the rear wheels 4 and 5 are all driven.

In this embodiment, a basic control is implemented in the manner as will be described hereinbelow.

A difference in cornering radius at the reference position of the vehicle body is set for each of the driven wheels 2 through 5 independently and separately from each other. The reference position is defined here as a middle position on a vertically straight axis between the positions CF and CR in FIG. 7. And correction efficients KS1 through KS4 for correcting the difference in cornering radius against the reference position are set for the driven wheels 2 through 5, respectively. The correction efficients KS1, KS2, KS3 and KS4 are used for correction of rotational speeds of the respective driven wheels 2, 3, 4 and 5. If rotational speeds detected by rotational number sensors 63 through 66 (FIG. 1) mounted on the driven wheels 2 through 5 are given as FL' (for the left-hand driven front wheel 2), FR' (for the right-hand driven front wheel 3), RL' (for the left-hand driven rear wheel 4) and RR' (for the right-hand driven rear wheel 5), respectively, the rotational speeds of the driven wheels 2 through 5 are given as follows:

$FL = FL' \times KS1$ $FR = FR' \times KS2$ $RL = RL' \times KS3$ $RR = RR' \times KS4$ As have been described hereinabove, the rotational speeds FL, FR, RL and RR are corrected so as to correspond to those at the reference position of the vehicle body.

And the slowest rotational speed DWS among the rotational speeds FL, FR, RL and RR is set as a vehicle speed SPB.

At the slip control using the engine, the average rotational speed SPR computed by formula Q11 in FIG. 21 is controlled so as to reach the target driven wheel rotational speed WF. More specifically, the average rotational speed SPR computed at the step Q21 in FIG. 21 is substituted for the average rear wheel speed SPR at the step P21 in FIG. 4. In the formula Q21, the rotational speeds FL, FR, RL and RR are all corrected using the correction coefficients KS1, KS2, KS3 and KS4, respectively. It is thus to be understood that the rotational speed SPR computed by the formula Q21 in FIG. 21 is eventually an average of the three driven wheel rotational speeds other than that used as the slowest vehicle speed DWS (=SPB) and further that the three driven wheels are the object for the slip control.

Figure 18:
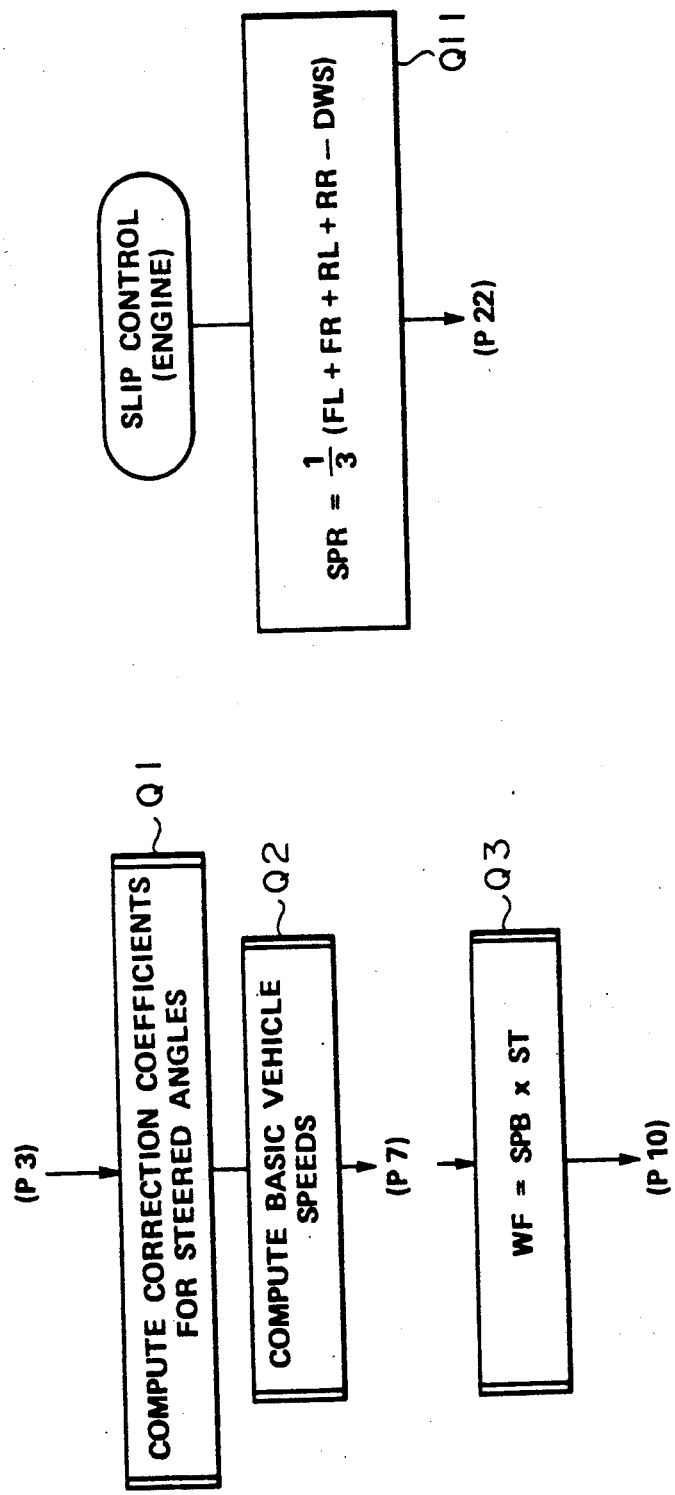

The flowchart in FIG. 18 uses subroutines Q1 and Q2 as well as subroutine Q3 as a substitution for the steps P4 through P6 in FIG. 3 as well as for the steps P8 and P9, respectively.

Figure 19:
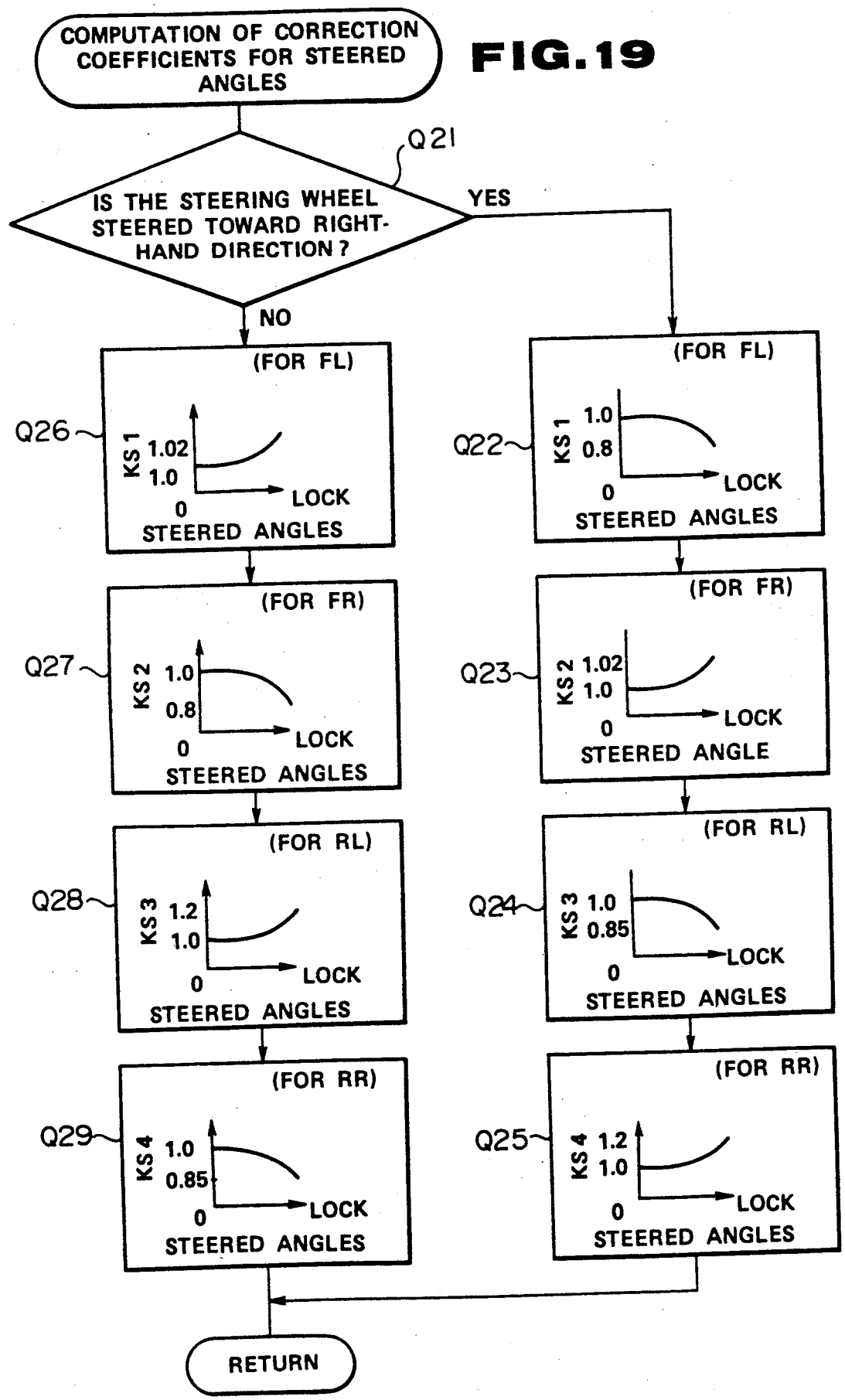

The subroutine Q1 relates to a computation of the correction coefficients KS1, KS2, KS3 and KS4 corresponding to steered angles of the steering wheel. FIG. 19 describes a detail of the subroutine Q1. At step Q21, it is judged whether or not the steering wheel is steered toward the right-hand direction. If NO at the step Q21, the processing as shown at steps Q26 through Q29 is effected to read in the correction coefficients KS1 through KS4 for the respective driven wheels 2 through 5. If YES at the step Q21, the processing as shown at steps Q22 through Q25 is likewise effected.

As shown in FIG. 20, the subroutine Q2 relates to a determination of the basic vehicle speed SPB. At step Q31, the rotational speeds FL', FR', RL' and RR' detected by the sensors 63, 64, 65 and 66 as well as the correction coefficients KS1, KS2, KS3 and KS4 for the driven wheels 2, 3, 4 and 5, respectively, are read in. At step Q32, the corrected rotational speeds FL, FR, RL and RR are computed by multiplying the rotational speeds FL', FR', RL' and RR' read in at step Q31 with the respective correction coefficients KS1, KS2, KS3 and KS4. Then at step Q33, it is judged whether or not the corrected left-hand front wheel rotational speed FL is slower than the corrected right-hand front wheel rotational speed FR. If YES at the step Q33, it is then judged at step Q34 whether or not the left-hand front wheel rotational speed FL is slower than the corrected left-hand rear wheel rotational speed RL. If YES at the step Q34, whether or not the left-hand front wheel rotational speed FL is slower than the corrected right-hand rear wheel rotational speed RR is further judged at step Q35. If it is judged YES at the step Q35, the left-hand front wheel rotational speed FL is set at step Q39 as the slowest rotational speed DWS.

If NO at the step Q33, it is then judged at step Q36 whether or not the right-hand front wheel rotational speed FR is slower than the left-hand rear wheel rotational speed RL. If YES at the step Q37, it is further judged whether or not the right-hand front wheel rotational speed FR is slower than the right-hand rear wheel rotational speed RR. If it is judged YES at the step Q37, the right-hand front wheel rotational speed FR is then set at step Q40 as the slowest rotational speed DWS.

If NO at the step Q36, it is then judged at step Q38 whether or not the left-hand rear wheel rotational speed RL is slower than the right-hand rear wheel rotational speed RR. If YES at the step Q38, the left-hand rear wheel rotational speed RL is set at step Q42 as the slowest rotational speed DWS.

If NO at the step Q35, Q37 and Q38, it is then judged that the right-hand rear wheel rotational speed RR is the slowest and set at step Q41 as the slowest rotational speed DWS.

The slowest rotational speed DWS set at the step Q39, Q40, Q41 or Q42 is then set as the basic vehicle speed SPB at step Q43.

In the subroutine Q3, the final target rotational speed WF is computed by multiplying the basic vehicle speed SPB set in the subroutine Q2 with the target slip ratio ST. It is now to be noted that the slip control is implemented at the step Q11 in FIG. 21 so as to allow the average rear wheel speed SPR to reach the target driven wheel rotational speed WF. Thus the slip control using the brake is separately and independently implemented so as to allow each of the rotational speeds for the three driven wheels other than that set as the slowest rotational speed, which was corrected at step Q32, to reach each the target driven wheel rotational speed WF.

The present invention has been described by way of the embodiments in which the torque applied to the driven wheels is adjusted by means of both the adjustment of the torque output from the engine and of the braking force from the brake. It is to be understood, however, that the present invention contains embodiments in which an application of the torque to the driven wheels may be adjusted by either of a reduction in the output torque or an application of the braking force. It is also noted that the torque to be applied to the driven wheels may be adjusted by any appropriate means such as, for example, changing gear ratios of a transmission, particularly such as an automatic transmission. It is further noted that the output from the engine may be adjusted by changing engine loads, air-fuel ratios, ignition timings, EGR amounts or the like.

It is to be understood that the foregoing text and drawings relate to embodiments of the present invention given by way of examples but not limitation. Various other embodiments and variants are possible within the spirit and scope of the present invention.

What is claimed is:

1. A slippage preventing apparatus for a vehicle with one pair of either front or rear wheels being driven and the other pair being undriven, comprising:
    driven wheel rotational speed detecting means for detecting a rotational speed of the driven wheel;
    undriven wheel rotational speed detecting means for detecting a rotational speed of the undriven wheel;
    cornering radius difference detecting means for detecting a difference in cornering radius between the driven wheel and the undriven wheel;
    torque adjusting means for adjusting a torque to be applied to the driven wheel by increasing or decreasing the torque;
    slip amount detecting means for detecting a slip amount or an amount of slippage of the driven wheel on a surface on the basis of the difference between the rotational speed of the driven wheel detected by said driven wheel rotational speed detecting means and the rotational speed of the undriven wheel detected by said undriven wheel rotational speed detecting means;
    slip amount controlling means for controlling the amount of slippage by increasing or decreasing the torque applied to the driven wheel by said torque adjusting means so as to reach a target slip amount; and
    correction means for correcting a control amount to be provided to said slip amount controlling means so as to compensate for deviations in detected slip amount resulting from the difference in cornering radius between the front and rear wheels detected by said cornering radius difference detecting means.

2. A slippage preventing apparatus as claimed in claim 1, wherein said slip amount controlling means controls said torque adjusting means so as to allow the rotational speed of the driven wheel to reach a target rotational speed corresponding to said target slip amount; and
    said correction means corrects said target rotational speed.

3. A slippage preventing apparatus as claimed in claim 2, wherein the rear wheels are driven; and
    said correction means corrects said target rotational speed to become smaller.

4. A slippage preventing apparatus as claimed in claim 2, wherein the front wheels are driven; and
    said correction means corrects said target rotational speed to become larger.

5. A slippage preventing apparatus as claimed in claim 1, wherein said correction means corrects said target slip amount.

6. A slippage preventing apparatus as claimed in claim 5, wherein the rear wheels are driven; and
    said correction means corrects said target slip amount so as to become smaller.

7. A slippage preventing apparatus as claimed in claim 5, wherein the front wheels are driven; and
    said correction means corrects said target slip amount so as to become larger.

8. A slippage preventing apparatus as claimed in claim 1, wherein said cornering-radial difference detecting means detects a steered angle of a steering wheel.

9. A slippage preventing apparatus for a vehicle, comprising:
    driven-wheel rotational-speed detecting means for detecting a rotational speed of a driven wheel;
    vehicle speed detecting means for detecting a vehicle speed on a surface at a predetermined reference position of a vehicle body;
    slip amount detecting means for detecting an amount of slippage, or a slip amount, of the driven wheel on a surface on the basis of the difference between the rotational speed detected by the driven wheel rotational speed detecting means and the vehicle speed detected by the vehicle speed detecting means;
    cornering radius difference detecting means for detecting a difference between a rotational radius at a predetermined position and a cornering radius of the driven wheel;
    target slip amount storing means for storing a target slip amount in advance using the difference between the rotational radius at the predetermined position and the cornering radius of the driven wheel and the vehicle speed as parameters;
    target slip amount selecting means for selecting the target slip amount corresponding to the vehicle speed detected by the vehicle speed detecting means and a cornering radius difference detected by the cornering radius difference detecting means from the target slip amount stored in the target slip amount storing means;

torque adjusting means for increasing or decreasing torque to be applied to the driven wheel; and slippage controlling means for controlling the torque adjusting means so as to allow the slip amount of the driven wheel detected by the slip amount detecting means to reach the target slip amount selected by the target slip amount selecting means.

10. A slippage preventing apparatus as claimed in claim 9, wherein:

the rear wheel is driven and the front wheel is undriven; and the target slip amount stored by the target slip amount storing means is set to be smaller when the cornering radius difference is larger than when it is smaller.

11. A slippage preventing apparatus as claimed in claim 9, wherein:

the front wheel is driven and the rear wheel is undriven; and the target slip amount stored by the target slip amount storing means is set to be larger when the cornering radius difference is larger than when it is smaller.

12. A slippage preventing apparatus as claimed in claim 9, wherein the slippage controlling means controls the torque adjusting means so as to allow the rotational speed of the driven wheel to reach a target rotational speed corresponding to the target slip amount selected by the target slip amount selecting means.

13. A slippage preventing apparatus as claimed in claim 9, wherein the torque adjusting means adjusts output of an engine.

14. A slippage preventing apparatus as claimed in claim 9, wherein the torque adjusting means comprises a brake for applying a braking force to the driven wheel.

15. A slippage preventing apparatus as claimed in claim 9, wherein the torque adjusting means comprises a first adjusting means for adjusting output of an engine and a second adjusting means for applying a braking force to the driven wheel.

16. A slippage preventing apparatus as claimed in claim 9, wherein the vehicle speed detecting means comprises undriven-wheel rotational-speed detecting means for detecting a rotational speed of the undriven wheel.

17. A slippage preventing apparatus as claimed in claim 16, wherein the undriven-wheel rotational-speed detecting means detects a mean value of the rotational speeds of the left-hand and right-hand undriven wheels.

18. A slippage preventing apparatus as claimed in claim 9, wherein the cornering radius difference detecting means detects a steered angle of a steering wheel.

19. A slippage preventing apparatus for a vehicle in which front wheels are undriven and rear wheels are driven, comprising:

driven-wheel rotational-speed detecting means for detecting a rotational speed of a driven wheel;

undriven-wheel rotational-speed detecting means for detecting a rotational speed of an undriven wheel;

slip amount detecting means for detecting an amount of slippage, or a slip amount, of the driven wheel on a surface on the basis of the difference between the rotational speed detected by the driven wheel rotational speed detecting means and the undriven-wheel speed detected by the undriven-wheel rotational-speed detecting means;

cornering radius difference detecting means for detecting a difference of cornering radii of between the undriven and driven wheels;

target slip amount storing means for storing a target slip amount in advance using the cornering radius difference between the front and rear wheels and the rotational speed of the undriven wheel as parameters and for adjusting the target slip amount stored in relation to the cornering radius difference determined by the cornering radius difference detecting means;

target slip amount selecting means for selecting the target slip amount corresponding to the undriven-wheel rotational speed detected by the undriven-wheel rotational speed detecting means and a cornering radius difference detected by the cornering radius difference detecting means from the target slip amount stored in the target slip amount storing means;

torque adjusting means for increasing or decreasing torque to be applied to the driven wheel; and slippage controlling means for controlling the torque adjusting means so as to allow the slip amount of the driven wheel detected by the slip amount detecting means to reach the target slip amount selected by the target slip amount selecting means.

20. A slippage preventing apparatus as claimed in claim 19, wherein the cornering radius difference detecting means detects a steered angle of a steering wheel.

21. A slippage preventing apparatus as claimed in claim 19, wherein the slippage controlling means controls the torque adjusting means so as to allow the rotational speed of the driven wheel to reach a target rotational speed in accordance with the target slip amount selected by the target slip amount selecting means.

22. A slippage preventing apparatus as claimed in claim 19, wherein the undriven-wheel rotational-speed detecting means detects a mean value of left-hand and right-hand undriven wheels.

* * * * *